Oct. 29, 1968  K. ULBRICHT  3,407,599

HYDRODYNAMIC POWER TRANSMISSION ASSEMBLY

Filed June 16, 1966  2 Sheets-Sheet 1

INVENTOR.
Kurt Ulbricht

BY

Michael J. Striker
Atty

Oct. 29, 1968  K. ULBRICHT  3,407,599
HYDRODYNAMIC POWER TRANSMISSION ASSEMBLY
Filed June 16, 1966  2 Sheets-Sheet 2

INVENTOR.
Kurt Ulbricht
BY
Michael S. Striker
Atty

United States Patent Office 3,407,599
Patented Oct. 29, 1968

3,407,599
HYDRODYNAMIC POWER TRANSMISSION ASSEMBLY
Kurt Ulbricht, Dresden, Germany, assignor to Institut fuer Leichtbau und Oekonomische Verwendung von Werkstoffen, Dresden, Germany
Filed June 16, 1966, Ser. No. 558,095
15 Claims. (Cl. 60—54)

ABSTRACT OF THE DISCLOSURE

A hydrodynamic torque converter connecting a prime mover to a pair of output means and including a housing containing a supply of fluid, impeller means rotatable in the housing to circulate the fluid, and a pair of turbines mounted in the housing and rotatable in response to circulation of the fluid, the prime mover being connected to the impeller means and the turbines being respectively connected to the pair of output means.

---

The present invention relates to power transmission assemblies in general, and more particularly to improvements in power plants of the type including a hydrodynamic torque converter. Still more particularly, the invention relates to a power plant which includes a hydrodynamic torque converter and which is especially suited for use as a means to transmit power to the wheels or treads of trucks, earth moving equipment and similar heavy-duty vehicles.

It is already known to equip a land vehicle with a power plant which includes a hydrodynamic torque converter, a so-called Föttinger torque converter. An important advantage of such power plants is that the speed of a vehicle whose power plant includes a torque converter may be varied between an infinite number of values and that the transmission ratio automatically conforms to the momentary load. Also, such power plants disconnect in automatic response to excessive loads, the wear on their components is low and such components can take up considerable stresses in response to changing load conditions. Furthermore, a vehicle embodying a power plant which includes a hydrodynamic torque converter can be rapidly accelerated to a desired speed and comprises a relatively small number of gears so that its construction is relatively simple and the power plant is less prone to malfunction.

A serious drawback of presently known power plants which include a hydrodynamic torque converter is that a vehicle utilizing such a power plant must comprise a differential. Therefore, many vehicles are still equipped with hydrostatic transmissions because such transmissions need not be combined with differentials.

Accordingly, it is an important object of the present invention to provide a power plant which includes a novel hydrodynamic torque converter and to construct and assemble the torque converter in such a way that, when the power plant is embodied in a road vehicle, the vehicle can be manipulated and driven properly without necessitating the provision of a differential.

Another object of the invention is to provide a hydrodynamic torque converter which, in addition to its basic function, also performs the function of a differential.

A further object of the invention is to provide a novel driving connection between the engine or another prime mover of a vehicle and the impeller of the improved torque converter.

An additional object of the invention is to provide a novel arrangement of power takeoff and coupling means for use in a power plant of the above outlined characteristics.

Still another object of the invention is to provide a land vehicle which embodies the improved power plant.

A concomitant object of the invention is to provide the vehicle with a live axle which includes component parts of the improved power plant.

Another object of the instant invention is to provide a heavy-duty vehicle which embodies the improved power plant.

Briefly stated, one feature of my present invention resides in the provision of a power plant which includes an internal combustion engine or another suitable prime mover, a novel hydrodynamic torque converter including a housing containing a supply of oil or another suitable fluid, a rotary impeller installed in the housing to circulate the fluid, and a pair of turbines mounted in the housing to rotate in response to circulation of the fluid, input means connecting the impeller with the prime mover, and a pair of output means each of which is driven by one of the turbines. The turbines are coaxial with the impeller and may but need not be mirror symmetrical with reference to a plane which is normal to their common axis. Thus, and if the aforementioned plane is the central symmetry plane of the housing, the two turbines may be located at the same side or at the opposite sides of such plane.

Each of the two output means comprises a shaft which may drive one or more wheels of a truck, earth moving machine, automobile or another vehicle. The two shafts then extend from the opposite sides of the housing and may transmit motion to the wheels through one or more transmissions, for example, through suitable planetary transmissions. These output shafts may be coupled to each other by resorting to a coupling which can be operated by remote control. Furthermore, the hydrodynamic torque converter may comprise one or more stationary guide rings which are coaxial with the turbines and are disposed therebetween.

The novel features which are considered as characteristic of the invention are set forth in particular in the appended claims. The improved power plant itself, however, both as to its construction and its mode of operation, together with additional features and advantages thereof, will be best understood upon perusal of the following detailed description of certain specific embodiments with reference to the accompanying drawings, in which:

Figure 1:
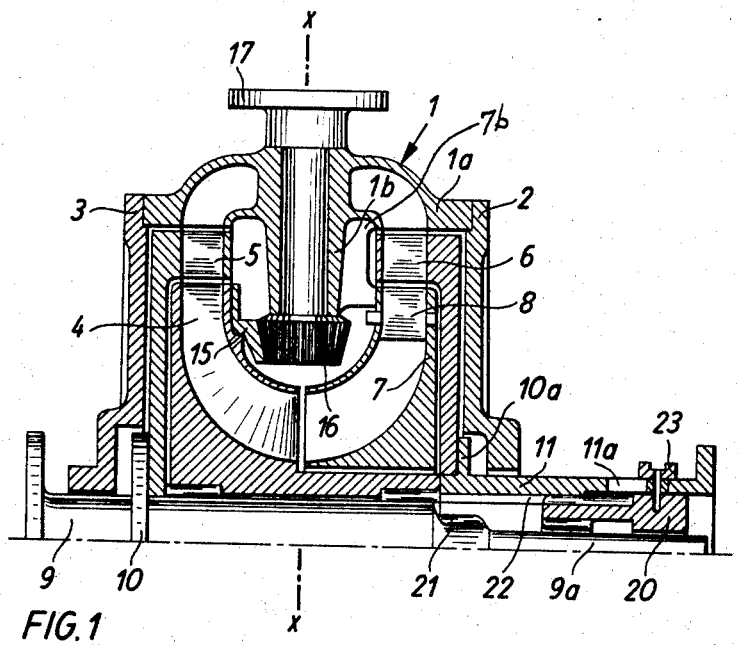
FIG. 1 is a fragmentary axial sectional view of a hydrodynamic torque converter which may be incorporated in the power plant of my invention and which comprises two mirror symmetrical turbines.

Referring to the drawings in detail, and first to FIG. 1, there is shown a portion of a power plant which embodies one form of my invention. The power plant comprises a prime mover preferably including an internal combustion engine (such as the engine 24 shown in FIG. 4) whose output shaft drives an input member 17 serving to rotate the impeller 4 of a specially constructed hydrodynamic torque converter. This converter comprises a housing 1 having two halves or portions which are mirror symmetrical with reference to a plane X—X. The housing 1 comprises a ring-shaped central portion 1a and two end walls 2, 3 defining with the central portion 1a a chamber which contains a supply of oil or another suitable fluid. The central portion 1a is provided with a radially inwardly extending bearing sleeve 1b for the input member 17. The driving connection between the input member 17 and the impeller 4 comprises a gear train including a small bevel pinion 16 attached to the inner end of the input member and a ring bevel gear 15 which is affixed to the impeller.

The housing 1 further accommodates two separate turbines 5 and 6 which are coaxial with the impeller 4 and are mirror symmetrical with reference to the plane X—X. These turbines will rotate when the impeller 4 is driven to circulate the liquid in the housing 1.

A guide ring or leading ring 7 is fixedly mounted in the housing 1 coaxially with the turbines 5 and 6. The guide vanes 8 of the guide ring 7 may be of the fixed or adjustable type. This ring guides the fluid from the turbine 6 back to the impeller 4 and reduces the turbulence of such fluid. The web 7b of the guide ring 7 is rigid with the bearing sleeve 1b.

The output means of the power plant comprises two coaxial shafts 9 and 11 which are respectively affixed to and are driven by the hubs of the turbines 5 and 6. The turbines 5 and 6 are constructed in such a way that torque transmitted to the shaft 9 is the same as that transmitted to the shaft 11. As shown, the output shaft 9 is provided with a collar 10 which is bolted to the turbine 5. A similar collar 10a of the output shaft 11 is bolted or otherwise affixed to the turbine 6. At least a portion of the shaft 11 is hollow to receive with clearance the right-hand end portion 9a of the shaft 9. The two shafts may be connected to each other by means of a coupling including an annular coupling element 20 provided with internal and external teeth to move into and from mesh with external teeth 21 of the shaft 9 and with internal teeth 22 of the shaft 11. A motion receiving portion 23 of the coupling element 20 extends through an axially parallel slot 11a of the shaft 11 and may be reciprocated by a suitable fork (not shown) which can be manipulated from the driver's seat. Each of the two shafts 9, 11 may drive one or more wheels or treads of a land vehicle, for example in a manner to be described in connection with FIG. 4. If desired, the wheels may be directly connected with the shafts 9 and 11. The coupling member 20 will be shifted to operative position to connect the shafts 9 and 11 when the torque converter need not perform the function of a differential.

Figure 2:
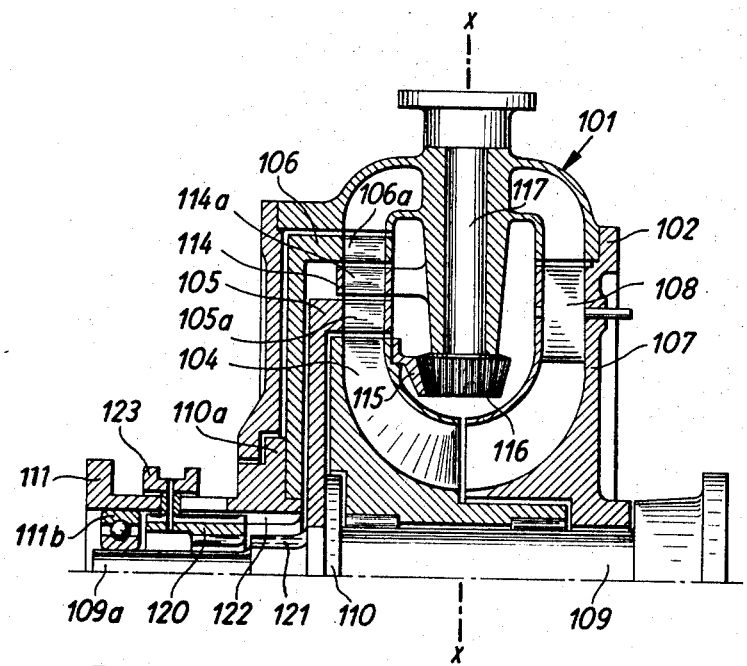
FIG. 2 is a similar fragmentary axial sectional view of a second torque converter wherein one of the turbines surrounds the other turbine.

FIG. 2 illustrates a portion of a second power plant which comprises a modified torque converter. Such components of the structure shown in FIG. 2 which are clearly identical with or analogous to the components of the structure shown in FIG. 1 are denoted by similar reference characters each preceded by the digit "1." The two serially arranged turbines 105, 106 are located at the same side of the symmetry plane X—X. The output shafts 109, 111 extend from the same side of the housing 101 and can be connected to each other by a coupling including the parts 120–123. A bearing 111b is interposed between the two output shafts and the shaft 109 also extends from the other side (beyond the end wall 102) of the housing 101. The turbine 105 surrounds the impeller 104 and the axis of the impeller coincides with the axes of turbines 105, 106 and their shafts 109, 111.

A second fixed leading ring or guide ring 114 is disposed between the turbines 105, 106 in such a way that its guides vanes 114a form an annulus between the turbine blades 105a, 106a. The guide vanes 114a may be of the adjustable type.

Figure 3:
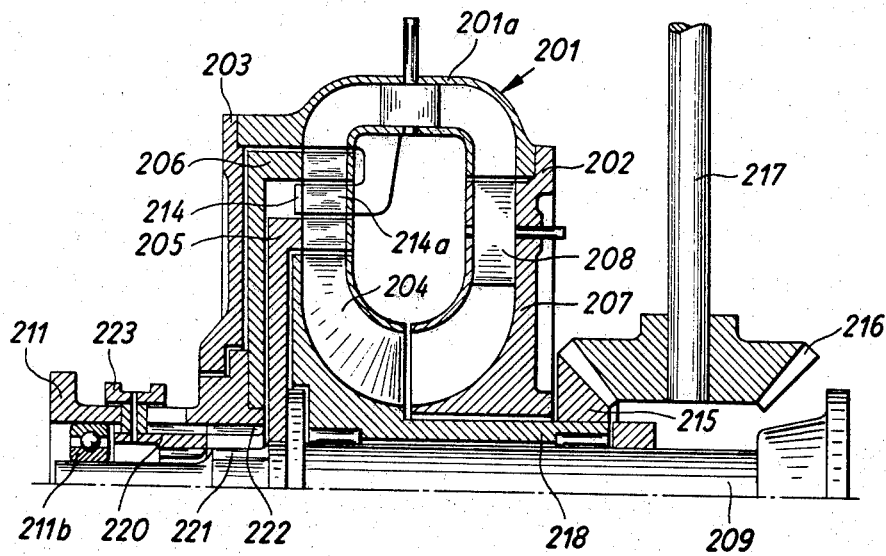
FIG. 3 is a fragmentary axial section through a third torque converter which constitutes a modification of the torque converter shown in FIG. 2.

Referring now to FIG. 3, there is shown a portion of a third power plant whose components are denoted by reference numerals similar to those used in FIG. 1 or 2 but each preceded by a digit "2." The impeller 204 is driven by a rotary input member 217 which need not extend into the housing 201. Thus, the hub of the impeller 204 comprises an annular extension 218 which carries the bevel gear 215, the latter meshing with the bevel pinion 216 outside of the housing 201, i.e., adjacent to the end wall 202. The extension 218 surrounds a portion of the output shaft 209 which is bolted to the turbine 205. The other turbine 206 is bolted to the output shaft 211. The torque converter of FIG. 3 comprises two stationary guide rings 207 and 214. The guide vanes 214a of the ring 214 can be of the fixed or adjustable type.

The basic operation of my improved torque converter is the same as that of a torque converter with a single turbine. However, in addition to such basic operation, the improved torque converter can also perform the function of a differential in the following way:

When the vehicle which embodies a conventional bevel gear differential travels in a curve or rounds a corner, the inside wheel which is nearer to the center of the curve rotates at a peripheral speed which is less than the speed in a straight path. The other or outside wheel rotates at a higher peripheral speed. The inside wheel tends to slip with reference to the road whereby the friction between the periphery of the inside wheel and the road surface increases. Such friction generates a force which opposes the rotation of the inside wheel and this force acts not unlike an added load to reduce the speed of the corresponding bevel gear. On the other hand, the outside wheel might even tend to rotate at a speed exceeding the speed of the corresponding turbine, i.e., the outside wheel might exhibit a tendency to spin and its tractive effort is reduced considerably. In such conventional differentials, the lowest torque is a determining factor for both wheels, i.e., the differential supplies to the wheels torque only to the extent that the wheels can use such torque without slipping.

In my improved torque converter, the two turbines can operate substantially independently of each other. Thus, they can act not unlike a differential without a lock but still capable to overcome loss of traction. The coupling 20–23, 120–123, or 220–223 will be applied when the torque converter need not perform the added function of a differential.

Figure 4:
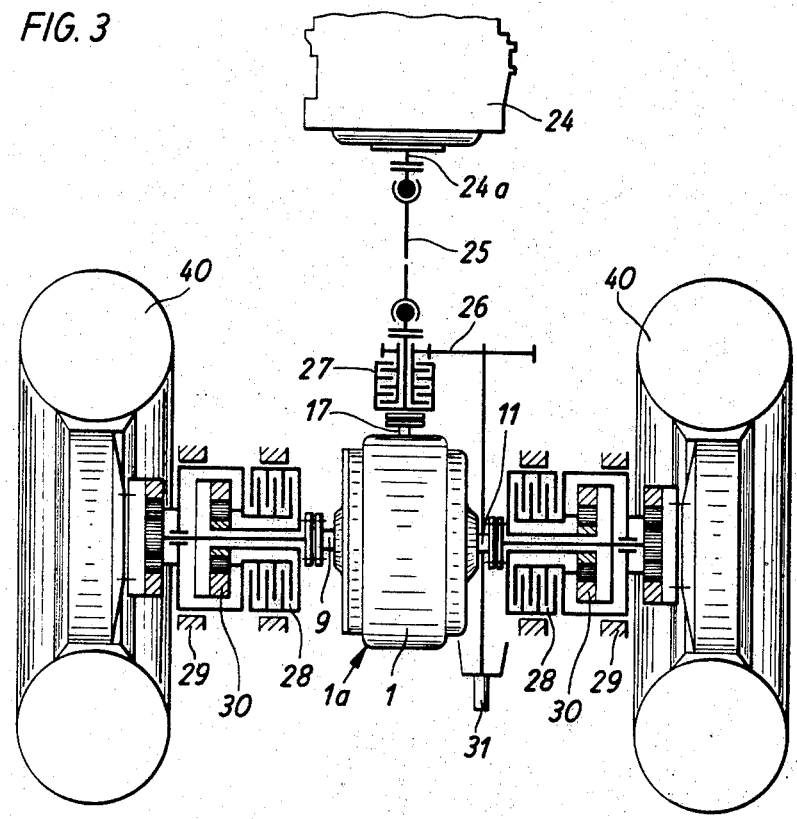
FIG. 4 is a somewhat diagrammatic top plan view of a complete power plant which is installed in a heavy-duty vehicle and which includes a torque converter of the type shown in FIG. 1, certain parts of the power plant being shown in section.

The manner in which the torque converter of my invention may be incorporated in the power plant of a vehicle is shown in FIG. 4. The engine 24 has an output shaft 24a which drives a Cardanic shaft 25. The latter is coupled to the input member 27 (see also FIG. 1) to drive the impeller 4 in the housing 1. The Cardanic shaft 25 is driven at a high speed. The vehicle of FIG. 4 is assumed to constitute a tractor having a power takeoff 31 which receives motion from the input member 17 through a suitable clutch 27 and a gear reducer 26. The takeoff 31 can drive the movable parts of an attachment of the type used in earth moving or agricultural machines.

The output shafts 9 and 11 of the torque converter form part of a live axle and can drive the wheels 40 of the tractor through the intermediary of one or more planetary or other suitable transmissions 30. FIG. 4 further shows clutches 28 which can change the speed of transmissions 30 and suitable brakes 29.

The torque transmitting characteristics of both turbines may be the same. The guide ring or rings serve to compensate for unsymmetric operating conditions.

While the improved power plant is especially useful in buses, tractors, agricultural machines, earth moving machines and other heavy-duty vehicles, it can be used with great advantage in passenger cars or even as a stationary power plant wherein the prime mover and the housing of the torque converter remain attached to a stationary support. For example, such a stationary power plant may be used to drive two separate units each of which can offer a variable resistance to transmission of torque. The exact configuration of turbine blades and/or guide vanes will depend on the intended use of the power plant. Insofar as I am advised at this time, the power plant will find preferred application in all such types of land vehicles which do not travel on rails and thus require a differential or an equivalent device which provides for differences in speed of rotation while the vehicle travels in an arcuate path.

When the improved hydrodynamic torque converter is incorporated in a vehicle, the torque transmitted by the two turbines is the same because, otherwise, the differential in torque transmitted to the two output shafts would produce a braking action. Since the second turbine is rotated by fluid which has dissipated a substantial amount of energy to rotate the first turbine, the blades of the second turbine must be configurated in such a way that this second turbine can transmit the same torque as the first turbine.

The two turbines can transmit different torque and can rotate at different speeds when the improved hydrodynamic torque converter is mounted on a stationary support and when the units receiving motion from the converter should receive different torque tor should rotate at different speeds.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be protected by Letters Patent is:

1. In a power plant, in combination, a prime mover; a hydrodynamic torque converter comprising a stationary housing containing a supply of fluid, impeller means rotatable in said housing to create a circulating fluid stream, a pair of turbines mounted in said housing in said circulating fluid stream, one of said turbines mounted immediately after said impeller means and said pair of turbines being rotatable in response to circulation of said fluid, and guide means in said stationary housing for guiding said fluid in said circulating fluid stream from said one of said turbines directly to the other of said turbines and from said other of said turbines to said impeller means for recirculation thereof by the latter; input means connecting said prime mover to said impeller means for rotating the same; and a pair of output means each driven by one of said turbines.

2. A structure as set forth in claim 1, wherein said turbines are coaxial with said impeller means and are mirror symmetrical with reference to a plane which is normal to their common axis.

3. A structure as set forth in claim 1, further comprising releasable coupling means for connecting said output means to each other.

4. In a power plant, in combination, a prime mover; a hydrodynamic torque converter comprising a housing containing a supply of fluid, impeller means rotatable in said housing to circulate said fluid, and a pair of turbines mounted in said housing and rotatable in response to circulation of fluid; input means connecting said prime mover with said impeller means; a pair of output means each driven by one of said turbines, each of said output means comprising a shaft, said shafts being coaxial and one thereof having a portion rotatably receiving a portion of the other shaft; and releasable coupling means comprising a coupling element movable into and from motion transmitting or motion receiving engagement with said portions of said shafts.

5. A structure as set forth in claim 1, wherein said input means comprises a drive shaft extending into said housing and a gear train connecting said shaft with said impeller means.

6. A structure as set forth in claim 1, wherein said impeller means comprises a portion extending from said housing and said input means comprises a drive shaft rotatable by said prime mover and a gear train connecting said shaft with said portion of said impeller means externally of said housing.

7. A structure as set forth in claim 1, wherein said guide means comprises a stationary guide ring disposed between said turbines.

8. A structure as set forth in claim 7, wherein said guide ring comprises adjustable guide vanes.

9. A structure as set forth in claim 1, further comprising at least one transmission coupled to each of said output means.

10. A structure as set forth in claim 9, wherein each of said output means comprises a shaft, said shafts extending from the opposite sides of said housing and each thereof constituting the input member of the respective transmission.

11. A structure as set forth in claim 1, wherein each of said output means comprises a shaft, said shafts being coaxial and extending from the opposite sides of said housing and each thereof being arranged to drive at least one wheel of a vehicle.

12. A structure as set forth in claim 1, further comprising a power takeoff and a driving connection between said input means and said takeoff.

13. In a power plant, in combination, a prime mover; a hydrodynamic torque converter comprising a housing containing a supply of fluid, impeller means rotatable in said housing to circulate said fluid, a pair of turbines mounted in said housing and rotatable in response to circulation of fluid, one of said turbines surrounding the other turbine and each of said turbines having an annulus of blades, and a fixed guide ring disposed between said turbines and having an annulus of guide vanes disposed between the blades of said turbines; input means connecting said prime mover with said impeller means; and a pair of output means each driven by one of said turbines.

14. In a power plant, in combination, a prime mover; a hydrodynamic torque converter comprising a housing containing a supply of fluid, impeller means rotatable in said housing to circulate said fluid, and a pair of turbines mounted in said housing and rotatable in response to circulation of fluid, one of said turbines surrounding said impeller means and the other turbine being arranged in series with said one turbine; input means connecting said prime mover with said impeller means and comprising a gear train; and a pair of output means each comprising a shaft connected with and driven by one of said turbines and said shaft extending from the opposite sides of said housing.

15. A structure as set forth in claim 14, further comprising a stationary guide ring provided inside said other turbine and releasable coupling means between said shafts, said impeller means being coaxial with said turbines and with said shafts.

References Cited

UNITED STATES PATENTS

| 2,465,919 | 3/1949 | Novak | 60—54 |
|---|---|---|---|
| 2,549,557 | 4/1951 | Yancho et al. | 60—54 |
| 3,001,409 | 9/1961 | Von Fumetti | 74—11 |
| 3,122,025 | 2/1964 | Mark et al. | 74—11 |
| 3,338,115 | 8/1967 | Ritzema | 60—54 XR |

FOREIGN PATENTS

| 256,250 | 9/1926 | Great Britain. |
|---|---|---|
| 769,893 | 3/1957 | Great Britain. |

EDGAR W. GEOGHEGAN, *Primary Examiner.*